(No Model.)
J. W. STEVENS.
STEAM GENERATOR.
No. 393,864. Patented Dec. 4, 1888.
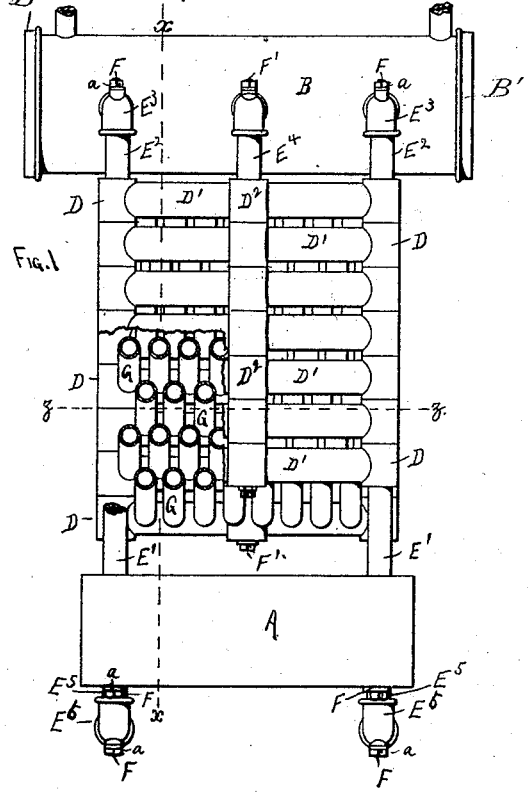
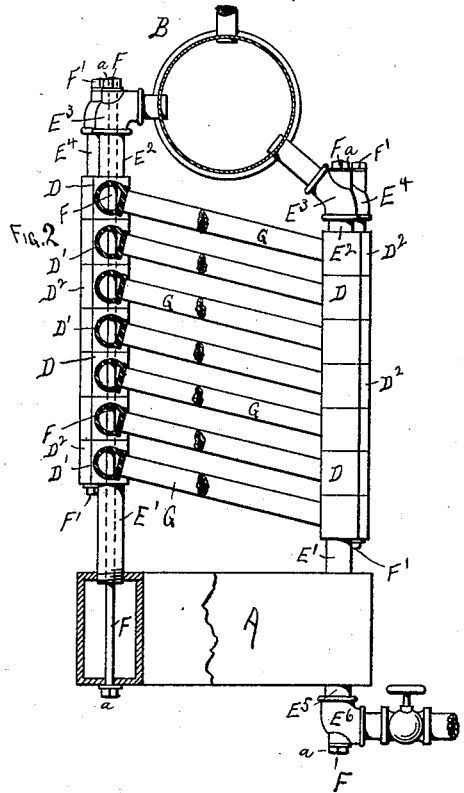
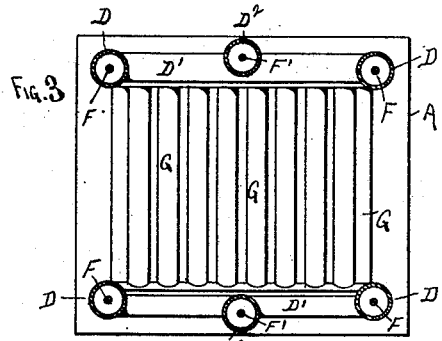
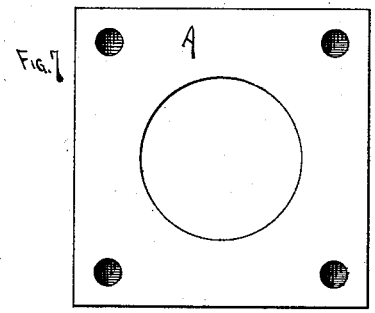
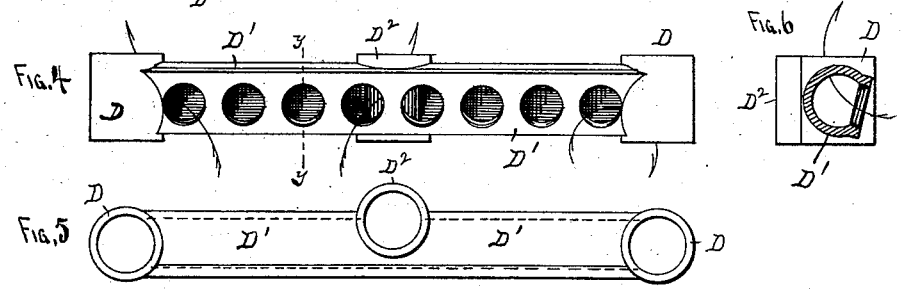
WITNESSES.
J. Anderson.
A. S. Webster.
J. Walter Stevens,
INVENTOR, BY
Charles N. Woodward,
Att'y.

UNITED STATES PATENT OFFICE.

JOHN WALTER STEVENS, OF ST. PAUL, MINNESOTA.

STEAM-GENERATOR.

SPECIFICATION forming part of Letters Patent No. 393,864, dated December 4, 1888.

Application filed March 12, 1888. Serial No. 266,932. (No model.)

*To all whom it may concern:*

Be it known that I, JOHN WALTER STEVENS, a citizen of the United States, residing at St. Paul, in the county of Ramsey and State of Minnesota, have invented certain new and useful Improvements in Steam-Generators, of which the following is a specification.

This invention relates to steam-generators; and it consists in the construction, combination, and arrangement of parts, as hereinafter shown and described, and specifically pointed out in the claim.

In the drawings, Figure 1 is a front elevation, Fig. 2 is a side elevation, and Fig. 3 is a plan view on the line Z Z of Fig. 1, of the furnace without its inclosing casing or shell, Figs. 1 and 2 being partially in section. Fig. 4 is a side elevation, Fig. 5 is a plan view, and Fig. 6 is a cross-sectional view on the line Y Y of Fig. 4, of one of the sections of the generator enlarged. Fig. 7 is a plan view of the fire-pot detached.

A represents the fire-pot, which is formed with hollow walls to contain water; and B, the steam-dome, the dome and fire-pot being connected by a series of short cylindrical sections, D, and piping $E'$ $E^2$, the whole firmly fastened together by tie-rods F, passing down through the elbows $E^3$ of the piping, thence through the sections D, and thence through the fire-pot, the ends of the rods being supplied with nuts $a$, by which the parts may be drawn tightly together. There will be as many series of these cylindrical sections as may be required, and the generator may be constructed, therefore, of any height by simply using a greater or less number of the sections. Each adjacent pair of the sections D is connected by a cross-tube, $D'$, and each opposite pair of these cross-tubes are connected by inclined tubes or pipes G, as shown.

Intermediate sections, $D^2$, are shown formed in the cross-tubes $D'$ at their centers, so as to connect all the cross-tubes of each side together, and they are also connected to the dome B by pipe-connections $E^4$, tie-rods $F'$ passing down through these intermediate sections in the same manner as through the corner-sections D, except that the intermediate sections are not connected to the fire-pot, but with the lower sections closed at their lower ends, except a hole for the rods $F'$.

The pipe-connections $E'$ between the sections D and the fire-pot on the rear side of the generator are shorter than the connections $E'$ on the front sections, so that the rear sections commence at a lower point than the front sections, to cause the connecting-tubes G to stand at an angle, as shown, to secure the necessary drainage of the system of piping and other parts and insure a complete and rapid circulation of the water.

The inclined tubes G are arranged alternately, as shown in Fig. 1, so that one horizontal line of tubes come above the spaces between the line below them. By this means the fire and products of the combustion are compelled to take a "zigzag" course among the tubes, thereby insuring a more complete contact of the heat with the tubes and the more economic use of the heat generated in the fire-pot. Another great advantage of this arrangement of the tubes is, that they are directly above the fire in the fire-pot, thereby receiving the full benefit of all the heat which arises therefrom.

By arranging the sections D $D'$ horizontally I am enabled to set the tubes G in the alternating or zigzag positions shown, and leave all parts open, so as to be entirely surrounded by the flame and heat. By this construction the water is retained in small compartments, which are entirely surrounded by the fire and heat, thereby greatly increasing the heating-surface without increasing the size or expense of the generator, and insuring a very rapid and free generation of the steam, and with great economy in the use of fuel, as all the heat rising from the fire-pot is utilized.

Beneath the fire-pot A, opposite the sections D on the rear side of the generator, are pipe-connections $E^5$ and elbows $E^6$, the rods F on that side being continued downward through these connections, as shown, so as to bind the whole firmly together. To one of these branches $E^5$ $E^6$ the return-piping is connected, while the other will be utilized as a means for "blowing off" the water from the generator, the live steam being taken from the top of the dome B.

Between the joints of the sections D will be suitable packing, which will not be affected by heat or moisture, (preferably a casket of asbestus or copper or other suitable metallic packing,) so as to insure a water-tight connection between the parts.

In large generators two or more series of the intermediate sections, $D^2$, might be employed, and in small generators the intermediate sections might be dispensed with, as the distance between the corner-sections would not be great enough to require it; but generally the construction shown will be the one employed.

Any suitable form of shell or casing may be employed to inclose the tubing and sections; but as the casing forms no necessary part of the present invention I have not shown it in the drawings.

The sections D and their connecting-tubes D' will generally be formed of cast-iron, while the tubes G and dome B will be of ordinary wrought-iron or steel piping.

The fire-pot A will generally be of cast-iron, but may be of wrought-iron or steel, if preferred.

The opposite sections, D' D', and their connecting-tubes G might be in one piece of cast-iron or steel; but generally they will be constructed as shown.

The dome B will preferably be formed, as before stated, of a section of wrought-iron or steel tubing, with screw-caps B' forming the ends, this construction insuring a very strong, cheap, and convenient dome peculiarly adapted to a generator of the class shown.

By this construction I produce a generator which can be manufactured at a comparatively small expense, and, being made of small parts, any part can be easily replaced when broken or burned out.

Another great advantage of the construction is the fact that the principal portions of the arrangement—viz., the adjacent sections D, connected by the tubes D', as shown in Figs. 4, 5, and 6—are all alike. Hence the increase or decrease of the size of the generator may be accomplished by merely increasing or decreasing the number of these sections. It also renders the transportation of the generator an easy matter, as the parts may be separated and packed in small packages or boxes or shipped separately, if required. The construction also forms a complete "sectional generator," thus insuring safety from explosions, as there is no opportunity for the accumulation of any large quantity of steam at any one point.

Having thus described my invention, what I claim as new is—

In a sectional steam-generator, the combination of the fire-pot A, the steam-dome B, the cross-tubes D', having the vertical end sections, D, and central sections, $D^2$, the pipe-sections E', connecting the fire-pot with the lower end sections, the upper pipe-connections, $E^2$, $E^3$, and $E^4$, connecting said vertical sections D and $D^2$ to the steam-dome, and the alternately-arranged inclined tubes G, connecting said cross-tubes D', substantially as described.

In testimony whereof I have hereunto set my hand in the presence of two subscribing witnesses.

J. WALTER STEVENS.

Witnesses:
O. D. WHEELER,
C. N. WOODWARD.